W. L. CALHOUN.
COTTON CHOPPER.
APPLICATION FILED MAY 6, 1913.
1,102,868.
Patented July 7, 1914.
2 SHEETS—SHEET 1.
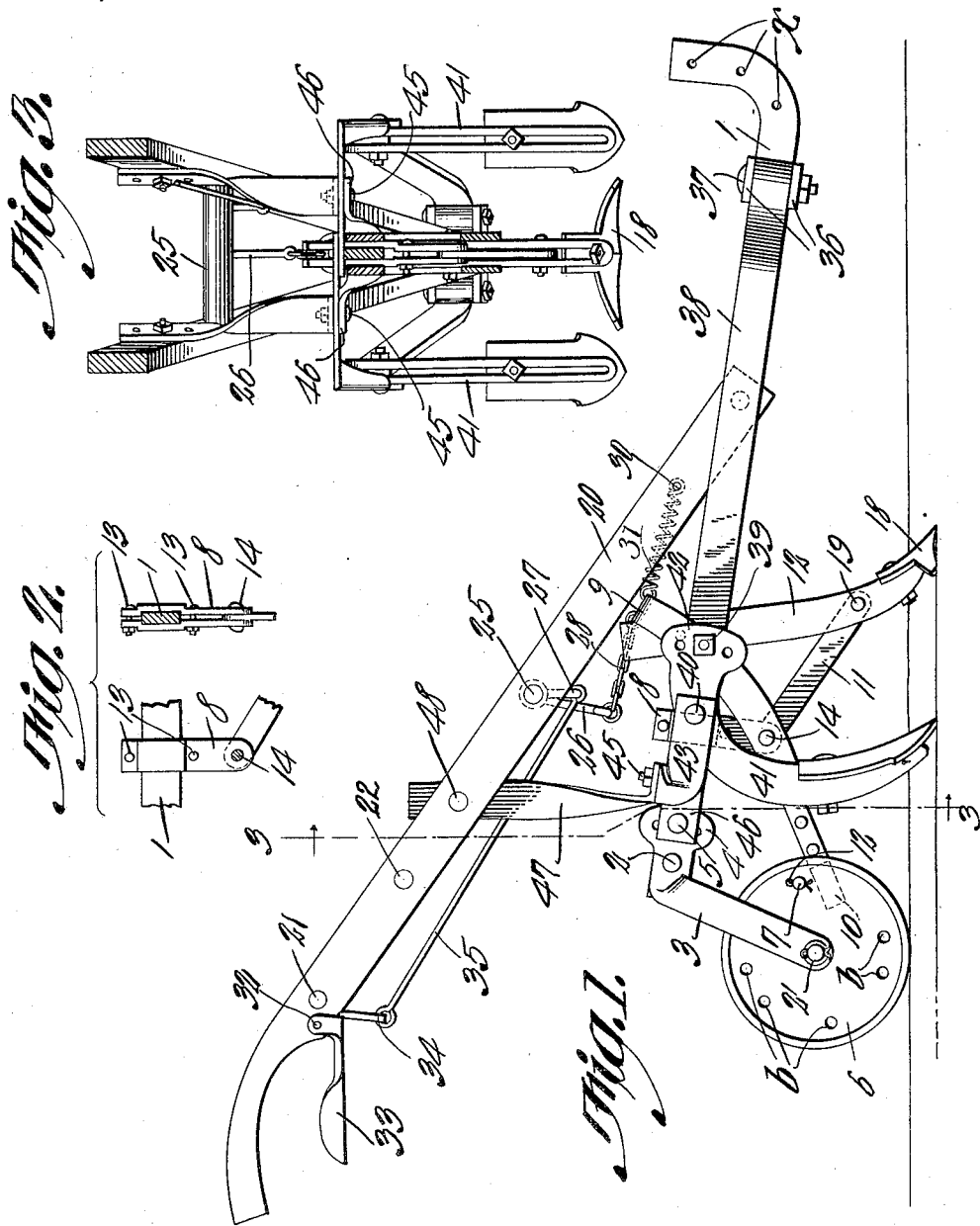
WITNESSES:
Jos. A. Ryan
May Barnes
INVENTOR
Washington L. Calhoun
BY
George W. Ives
ATTORNEY W. L. CALHOUN.
COTTON CHOPPER.
APPLICATION FILED MAY 6, 1913.
1,102,868.
Patented July 7, 1914.
2 SHEETS—SHEET 2.
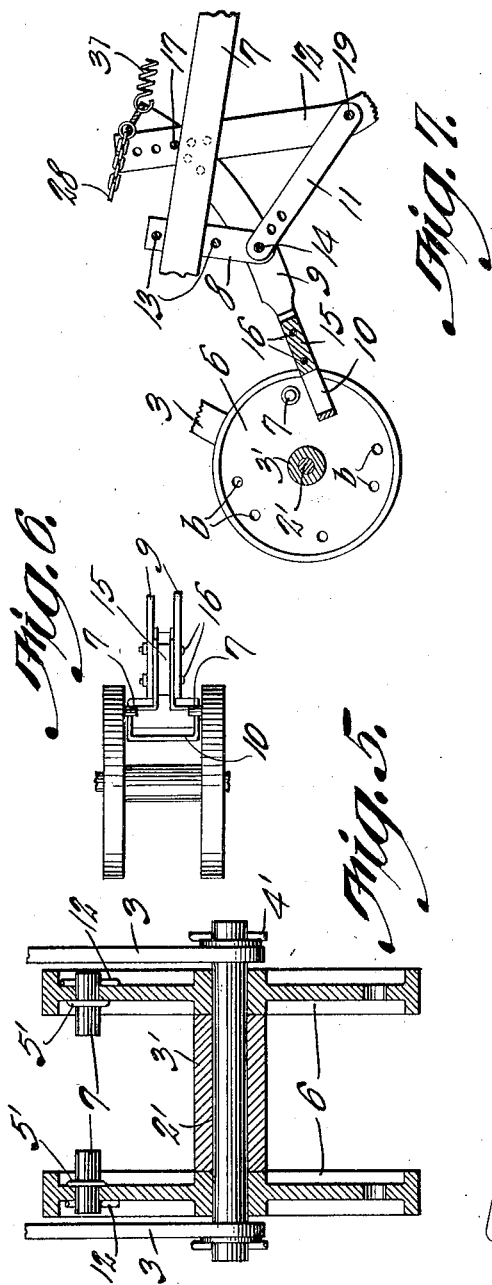
WITNESSES:
Jos. A. Ryan
May Barnes
INVENTOR
Washington L. Calhoun
BY
George W. Sues, ATTORNEY

UNITED STATES PATENT OFFICE.

WASHINGTON L. CALHOUN, OF TARRYTOWN, GEORGIA.

COTTON-CHOPPER.

1,102,868.     Specification of Letters Patent.     Patented July 7, 1914.

Application filed May 6, 1913. Serial No. 765,877.

*To all whom it may concern:*

Be it known that I, WASHINGTON L. CALHOUN, a citizen of the United States, and a resident of Tarrytown, in the county of Montgomery and State of Georgia, have invented certain new and useful Improvements in Cotton-Choppers, of which the following is a description.

This invention relates to certain new and useful improvements in cotton choppers, and the object of my invention is to provide an implement for cutting openings in a row of growing cotton plants, so as to leave them in bunches or hills, the machine being automatic in its operation, though provided with a manually controlled trip, arranged to throw the chopper blade out of action.

With these and other objects in view the present invention consists in the combination and arrangement of parts, as will be hereinafter more fully described and finally pointed out in the appended claims, it being further understood that changes in the specific structure shown and described may be made within the scope of the claims, without departing from the spirit of the invention.

In the accompanying drawings forming a part of this specification and in which like numerals of reference indicate similar parts in the several views, Figure 1, shows a side elevational view of a cotton chopper embodying my invention. Fig. 2, shows detail of the hanger bars. Fig. 3, is a section on line 3, 3, of Fig. 1. Fig. 4, is a top view. Fig. 5, is a sectional detail through the supporting wheels. Fig. 6, shows a detached detail disclosing the method of securing the striker head to the yoke. Fig. 7, shows a detail partly in section disclosing the arrangement of the brace bar and its connection to the hanger bars.

In my present invention, I provide a cotton chopper including a main drag bar 1, which at its rear end is provided with a bolt opening arranged to receive the pivot bolt 2. At the forward end, the bar is curved upward as shown in Fig. 1, and provided with the openings $x$, arranged to be engaged by the clevis hook, forming a part of the harness of the animal dragging the cotton chopper. Pivotally held upon the pivot bolt 2, are two similar carrying arms 3, each arm having an apertured head 4, within the apertures of which is held a securing bolt 4, passing through a suitable opening within the end of the drag bar. At their lower ends these carrying arms, as shown in Fig. 5, give support to the supporting wheels 6 which are secured to the spool 3' the spool and wheels revolving upon the shaft 2'. The shaft 2' is held in position by means of the cotter pins 4'.

As shown in Fig. 7 each supporting wheel 6, is provided with a plurality of openings $b$, and arranged to be removably held within these openings $b$, are the striker pins 7, each of which has a stop shoulder 5'. These striker pins are held in position by means of the cotter pins 12. Adjustably held to the drag bar 1, are the two similar hanger bars 8 which are clamped upon the bar 1 by means of the bolts 13. At their lower ends these hanger bars 8 support the bolt 14. Pivotally held upon the bolt 14, is the yoke 9, comprising two similar members which are slightly curved and at their lower ends are held in parallel spaced relation by means of a block 15, the ends being clamped to the block by means of the bolts 16. These bolts also secure the striker head 10 preferably made of sheet metal and arranged to be normally in the path of the striker pins 7 to the yoke as shown in the drawings. Near the upper end, as shown in Fig. 7, the yoke 9 is provided with the stop bolt 17 arranged to strike upon the upper edge of the drag bar 1. This stop bolt 17 also supports the colter bars 12 which at their lower ends are provided with the share 18. Intermediate of their ends the colter bars are provided with the bolt 19 upon which is held the brace bar 11 which bar at its upper end is secured to the bolt 14 within the end of the hanger bars 8, this construction being clearly shown in Fig. 7. The brace bar 11 as well as the yoke 9 and the colter bars 12 are provided with a plurality of openings so that the colter bars 12 can be adjustably secured to the bolt 14. Secured at their lower ends to the drag bar 1, are the two similar handle bars 20 which near their upper ends are strengthened by means of the brace bars 21 and 22. At their lower ends these handle bars are secured to the drag bar by means of the bolt 23 as disclosed in Fig. 4. Near their lower ends these handle bars give support to the rock shaft 25 which has an extending arm 26 and an ear 27. Extending from the lower end of the arm 26 is the chain 28, which has its other end secured within the bight portion of the yoke 9 as clearly shown in Fig. 7. Extending from a pin 30 secured within the lower ends of the handle bars 20, is the spring 31 which has its other end secured to the bight portion of the yoke 9. This spring 31 normally forces the pin 17 into engagement with the drag bar 1, as shown in Fig. 7. Secured to one of the handles by means of a pin 32, is the trip lever 33 to the end 34, of which is secured the connecting rod 35, which has its other end secured to the ear 27 as shown in Fig. 1. By means of this trip lever the colter share 18 can be drawn out of the ground by hand.

Clamped upon the forward end of the drag bar 1, are the upper and lower clamp plates 36, held in position by means of the two bolts 37, shown in Fig. 4. Extending from each bolt 37 and pivotally held thereon, is a side bar 38, and each bar near its rear end, is provided with two bolts 39 and 40. The bolt 40 gives pivotable support to the shovels 41, which have the enlarged heads 42, having suitable openings as shown in Fig. 1 so that these shovels are adjustably secured to the side bar 38. These bolts in addition give support to the brackets 43, which are bent at right angle and are provided with slots as shown in Fig. 4, to adjustably receive the clamp bolts 45.

As shown in Fig. 1, the securing bolt 5 gives support to the angle bars 46, which also have their ends slotted to adjustably receive the clamp bolts 45. The position of the angle bars 46, is also shown in Fig. 3. In addition to holding the brackets 43 to the angle bars 46 the bolts pass through the lower ends of the standards 47, which standards at their lower ends are secured to the handle bars 20 by means of bolts 48. By means of this construction the side bars can be swung toward or away from the drag bar 1. The openings b, are so arranged that the share 18 can be tripped once, twice or three times or four times to each revolution of the wheel 6.

It is of course understood that while I have described my device as a cotton chopper that the same can be used in connection with other plants were it necessary to thin them out.

My cotton chopper is simple and inexpensive in construction and both durable and efficient in operation and the adjustment of the several adjustably secured members can be effected with ease, accuracy and despatch.

Having thus described my said invention what I claim as new and desire to secure by United States Letters Patent is:

1. The combination in a cotton chopper, of a drag bar having a terminal opening, a pivot bolt within said opening, two carrying arms held upon said bolt each having an apertured head, a securing bolt passing through said heads to adjustably secure said arms to said bar, supporting wheels secured to said arms, a striker pin carried by one of said wheels, a hanger bar adjustably secured to said drag bar, a yoke pivotally secured to said hanger bar having a striker head normally held in the path of said pin, a brace bar adjustably secured to said hanger bar, and a colter bar adjustably secured at one end to said yoke and near its other end to said bar.

2. The combination in a cotton chopper, of a drag bar having a terminal bolt opening, a pivot bolt within said opening, two carrying arms held upon said bolt each having an apertured head, a securing bolt passing through said heads to adjustably secure said arms to said bar, supporting wheels secured to said arms, a striker pin carried by one of said wheels, a hanger bar adjustably secured to said drag bar, a yoke pivotally secured to said hanger bar having a striker head normally held in the path of said pin, a brace bar adjustably secured to said hanger bars, a colter bar adjustably secured at one end to said yoke and near its other end to said brace bar, and a stop pin limiting downward movement of said yoke.

3. The combination in a cotton chopper, of a drag bar having a terminal bolt opening, a pivot bolt within said opening, two carrying arms held upon said bolt each having an apertured head, a securing bolt passing through said heads to adjustably secure said arms to said bar, supporting wheels secured to said arms, a striker pin carried by one of said wheels, a hanger bar adjustably secured to said drag bar, a yoke pivotally secured to said hanger bar having a striker head normally held in the path of said pin, a brace bar adjustably secured to said hanger bar and a colter bar adjustably secured at one end to said yoke and near its other end to said brace bar, a stop pin to limit the downward movement of said yoke and a spring to normally force said yoke in one direction.

4. The combination in a cotton chopper, of a drag bar having a terminal bolt opening, a pivot bolt within said opening, two carrying arms held upon said bolt each having an apertured head, a securing bolt passing through said heads to adjustably secure said arms to said drag bar, supporting wheels secured to said arms, a striker pin carried by one of said wheels, a hanger bar adjustably secured to said drag bar, a yoke pivotally secured to said hanger bar having a striker head normally held in the path of said pin, a brace bar adjustably secured to said hanger bar, and a spring to normally force said yoke in one direction.

5. The combination in a cotton chopper, of a drag bar having a terminal bolt opening, a pivot bolt within said opening, two carrying arms held upon said bolt each having an apertured head, a securing bolt passing through said heads to adjustably secure said arms to said bar, supporting wheels secured to said arms, a striker pin carried by one of said wheels, a hanger bar adjustably secured to said drag bar, a yoke pivotably secured to said hanger bar having a striker head normally held in the path of said pin, a brace bar adjustably secured to said hanger bar, handle bars extending from said drag bar, a trip lever secured to one of said handle bars, and a connection extending from said lever to said yoke.

In testimony whereof I affix my signature, in the presence of two witnesses.

WASHINGTON L. CALHOUN.

Witnesses:
A. L. WHEELER,
D. F. WAMOCK.

Copies of this patent may be obtained for five cents each, by addressing the "Commissioner of Patents, Washington, D. C."